US012651225B2

(12) United States Patent
Tan

(10) Patent No.: US 12,651,225 B2
(45) Date of Patent: Jun. 9, 2026

(54) METHOD FOR AUTOMATICALLY GENERATING RISK EVALUATION DIMENSION LIBRARY FOR EIP

(71) Applicant: BEIJING LINGTRACE SECURITY TECHNOLOGY CO., LTD., Beijing (CN)

(72) Inventor: Yuefei Tan, Beijing (CN)

(73) Assignee: Beijing Lingtrace Security Technology Co., Ltd., Beijing (CN)

( * ) Notice: Subject to any disclaimer, the term of this patent is extended or adjusted under 35 U.S.C. 154(b) by 640 days.

(21) Appl. No.: 18/323,271

(22) Filed: May 24, 2023

(65) Prior Publication Data

US 2023/0385737 A1     Nov. 30, 2023

(30) Foreign Application Priority Data

May 25, 2022     (CN) .......................... 202210573497.0

(51) Int. Cl.
| | |
|---|---|
| *G06Q 10/0635* | (2023.01) |
| *G06F 8/10* | (2018.01) |
| *G06F 8/73* | (2018.01) |
| *G06F 8/75* | (2018.01) |
| *G06F 21/57* | (2013.01) |

(52) U.S. Cl.
CPC ........... *G06Q 10/0635* (2013.01); *G06F 8/10* (2013.01); *G06F 8/73* (2013.01); *G06F 8/75* (2013.01); *G06F 21/57* (2013.01)

(58) Field of Classification Search
None
See application file for complete search history.

(56) References Cited

U.S. PATENT DOCUMENTS

| | | | |
|---|---|---|---|
| 2022/0261882 A1* | 8/2022 | Youb .................. | G06Q 30/0645 |
| 2023/0385737 A1* | 11/2023 | Tan ..................... | G06Q 10/0635 |
| 2025/0173427 A1* | 5/2025 | Kocher ................... | G06F 21/53 |

(Continued)

OTHER PUBLICATIONS

Robertson, "Blockchain Governance: An Outsider's Perspective", 2018, https://jolt.law.harvard.edu/digest/blockchain-governance-an-outsiders-perspective (Year: 2018).*

(Continued)

*Primary Examiner* — Hossain M Morshed

(74) *Attorney, Agent, or Firm* — Kinney & Lange, P.A.

(57) ABSTRACT

The present disclosure provides a method for automatically generating a risk evaluation dimension library for an Ethereum Improvement Proposal (EIP), which belongs to the technical field of blockchains. The method includes: extracting the EIP, and automatically extracting information about all interfaces in the EIP, where the information includes standards, protocols, parameters, return values, visibility and function modifiers; and constructing a risk matrix library of the EIP by taking the interfaces as one dimension and taking the parameters, the return values, the visibility and the function modifiers as other dimensions, and evaluating a risk of the EIP according to an EIP standard and an element definition standard in the EIP standard. According to the present disclosure, problems of big errors and low efficiency caused by manual extraction are solved, a speed and accuracy of extraction are better, and evaluation results can be stored.

16 Claims, 2 Drawing Sheets

Extract an EIP, and automatically extract information about all interfaces in the EIP, where the information includes standards, protocols, parameters, return values, visibility and function modifiers Construct a risk matrix library of the EIP by taking the interfaces as one dimension and taking the parameters, the return values, the visibility and the function modifiers as the other dimensions, and evaluate a risk of the EIP according to an EIP standard and an element definition standard in the EIP standard

(56)　　　　　　References Cited

U.S. PATENT DOCUMENTS

| 2025/0237476 A1 * | 7/2025 | Searle | ................. | B65D 81/052 |
| 2025/0342528 A1 * | 11/2025 | Doney | ................ | G06Q 20/405 |
| 2026/0067071 A1 * | 3/2026 | Doney | .................... | H04L 9/085 |

OTHER PUBLICATIONS

Kushwaha, "Systematic Review of Security Vulnerabilities in Ethereum Blockchain Smart Contract", 2021, IEEE (Year: 2021).*
Chen, "A Survey on Ethereum Systems Security: Vulnerabilities, Attacks, and Defenses", 2021, ACM (Year: 2021).*

* cited by examiner

Extract an EIP, and automatically extract information about all interfaces in the EIP, where the information includes standards, protocols, parameters, return values, visibility and function modifiers Construct a risk matrix library of the EIP by taking the interfaces as one dimension and taking the parameters, the return values, the visibility and the function modifiers as the other dimensions, and evaluate a risk of the EIP according to an EIP standard and an element definition standard in the EIP standard

FIG. 1

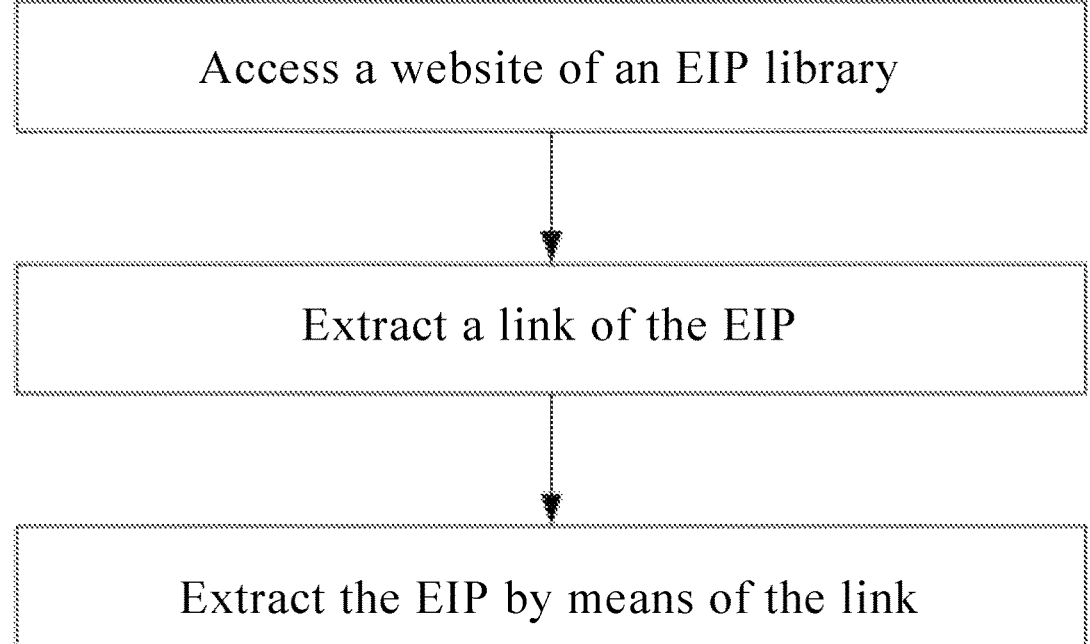

Access a website of an EIP library

Extract a link of the EIP

Extract the EIP by means of the link

METHOD FOR AUTOMATICALLY GENERATING RISK EVALUATION DIMENSION LIBRARY FOR EIP

CROSS REFERENCE TO RELATED APPLICATION

This patent application claims the benefit and priority of Chinese Patent Application No. 202210573497.0, filed with the China National Intellectual Property Administration on May 25, 2022, the disclosure of which is incorporated by reference herein in its entirety as part of the present application.

TECHNICAL FIELD

The present disclosure belongs to the technical field of blockchains, and particularly relates to a method for automatically generating a risk evaluation dimension library for an Ethereum Improvement Proposal (EIP).

BACKGROUND

An Ethereum Improvement Proposal (EIP) is a standard proposed to define the development of Ethernet software (including client software, smart contracts, etc.). Once an EIP is reviewed and approved by the Ethereum core team, it will be recommended as a standard for Ethereum developers throughout the world to follow and use. The key developments and deployments of Ethereum are currently driven by a series of EIPs. While developing an Ethereum application in accordance to an EIP approved, a developer needs to check the standards, protocols, parameters, return values, visibility and function modifiers defined in the EIP and analyze possible attacks on codes implemented in accordance with the EIP, possible security risks, and precautionary measures to prevent such attacks and avoid security risks and vulnerabilities in concrete implementation.

Moreover, smart contracts running on Ethereum cannot be modified or withdrawn once they are deployed to Ethereum. Thus, as for a smart contract application, in order to ensure that the smart contract is successful once it is deployed, and especially to ensure that the contract is as secure as possible (i.e., with few or even no security vulnerabilities and hidden dangers), the developer will submit codes to a third-party code auditing company for review before deploying the contract to Ethereum. The third-party code auditing company will find out the vulnerabilities and security risks and eliminate them before deployment. Consequently, contract auditing plays a crucial role in the development of Ethereum contracts. When reviewing codes of the smart contract, auditors compare the codes with the EIP, review whether the codes implement the standards, protocols, parameters, return values, visibility and function modifiers defined in the EIP, and check whether all these elements have been secured in the codes, to prevent possible risks and vulnerabilities.

For a complicated application involving a large number of EIPs, both the developers and the auditors are required to view and analyze in detail all the EIP standards involved in the codes, and check the elements in each EIP standard one by one. Typically, the EIP standards are searched and queried manually one by one with low efficiency, inescapable flaws and low accuracy, because the developers and the auditors cannot be thoroughly familiar with the EIP standards.

In view of above technical problems, the present disclosure provides a method for automatically generating a risk evaluation dimension library for an EIP.

SUMMARY

In order to achieve an objective of the present disclosure, the present disclosure adopts the following technical solutions:

According to an aspect of the present disclosure, a method for automatically generating a risk evaluation dimension library for an Ethereum Improvement Proposal (EIP) is provided.

The method for automatically generating a risk evaluation dimension library for an EIP specifically includes:

S1: extracting the EIP, and automatically extracting information about all interfaces in the EIP, where the information includes standards, protocols, parameters, return values, visibility and function modifiers; and S2: constructing a risk matrix library of the EIP by taking the interfaces as one dimension and taking the parameters, the return values, the visibility and the function modifiers as other dimensions, and evaluating a risk of the EIP according to an EIP standard and an element definition standard in the EIP standard.

Firstly, the EIP is extracted, and the information about all the interfaces involved in the EIP is extracted, the information including standards, protocols, parameters, return values, visibility and function modifiers. The risk matrix library of the EIP is constructed by taking the interfaces as one dimension and taking the parameters, the return values, the visibility and the function modifiers as other dimensions, and the risk of the EIP is evaluated in multi-dimensions according to preset relevant standards, such that a risk situation in this case may be determined automatically and accurately.

By using automatic extraction, the information about all the interfaces involved in the EIP, including standards, protocols, parameters, return values, visibility and function modifiers, are extracted. According to the requirements of the standards, the risk matrix library of the EIP is constructed by taking the interfaces as one dimension and taking the parameters, the return values, the visibility and the function modifiers as other dimensions, to evaluate the risk of the EIP. The problems of long time, low efficiency, omission of the EIP standard that should be inspected and the elements defined in the EIP standard, and ignorance of safety measures that need to be considered for these elements in an original method that only adopts manual search are solved, such that the risk of the EIP may be evaluated more quickly and accurately.

In a further technical solution, any one or more of the standards, the protocols, the parameters, the return values, the visibility and the function modifiers in the EIP may also be automatically extracted, and a risk of any one or more of the standards, the protocols, the parameters, the return values, the visibility and the function modifiers is evaluated according to a requirement of a corresponding standard. When the risk of the EIP needs to be evaluated only from some or any one of the standards, the protocols, the parameters, the return values, the visibility and the function modifiers, only some or any one of the standards, the protocols, the parameters, the return values, the visibility and the function modifiers needs to be extracted, to be subjected to a risk evaluation, such that a risk evaluation strategy in this case is more controllable and diversified.

Further, extracting the EIP specifically includes:

S11: accessing a website of the EIP library;

S12: extracting a link of the EIP; and

S13: extracting the EIP by means of the link.

Since an EIP stored in a server is basically displayed through a webpage, and the EIP is extracted by means of the link of the EIP, such that the data may be conveniently extracted, and complete and accurate extraction of the EIP may be achieved.

In a further technical solution, the information about all the interfaces in the EIP is located by means of a paragraph corresponding to a keyword "specification", and is then extracted, and when the keyword of the paragraph where the information is located changes, the information is extracted according to a paragraph corresponding to the changed keyword.

In general, when information about all interfaces in an EIP is stored in a webpage, the information is stored in a paragraph corresponding to a keyword "specification". When the definition of the keyword changes in a later stage, the paragraph in this case is correspondingly adjusted and extracted according to the changed keyword, to accurately locate and extract the information.

In a further technical solution, the information about all the interfaces is located by means of a keyword "function" corresponding to the information, data between a symbol (and a symbol) during location is extracted, a visibility keyword and a function modifier keyword defined after the symbol) are extracted, and when a definition mode or an information storage mode corresponding to the information about all the interfaces later changes, the information is extracted in a new definition mode.

In general, the information about all interfaces is started with a corresponding keyword "function", the data is stored between the symbol (and the symbol), the visibility keyword and the function modifier keyword are stored after the symbol), and when the definition mode changes, an automatic extraction method extracts the information in a new definition mode.

In a further technical solution, the extracted data, the visibility keyword and the function modifier are stored in a row vector $M_i$ in a form of an element, i being all ith interfaces, $M_i=[a_{i1}, a_{i2}, \ldots, a_{ij}]$, $a_{ij}$ representing a jth element of all the ith interfaces, a number of elements is j in total, and when a total number of the data, the visibility keywords and the function modifiers corresponding to all the interfaces is less than j, the remaining elements are supplemented in a form of empty elements.

By storing the extracted data, the visibility keywords and the function modifiers in the row vectors, a final structure becomes more consistent, so as to greatly facilitate determination of information about all interfaces.

In a further technical solution, row vectors of all the interfaces are stored in a form of a matrix.

In a further technical solution, the elements in the matrix are stored in a type of structure data.

In another aspect, an embodiment of the present application provides a computer-readable storage medium, storing a computer program. When the computer program is executed in a computer, the computer executes the above method for automatically generating a risk evaluation dimension library for an EIP.

In yet another aspect, an embodiment of the present application provides a computer program product, storing an instruction. When the instruction is executed by a computer, the computer implements the above method for automatically generating a risk evaluation dimension library for an EIP.

BRIEF DESCRIPTION OF THE DRAWINGS

The above and other features and advantages of the present disclosure will become more apparent by describing illustrative implementation modes in detail with reference to the accompanying drawings.

FIG. 1 is a flowchart of a method for automatically generating a risk evaluation dimension library for an Ethereum Improvement Proposal (EIP) according to Embodiment 1.

FIG. 2 is a flowchart showing specific steps of extracting the EIP in Embodiment 1.

DETAILED DESCRIPTION OF THE EMBODIMENTS

Figure 3:
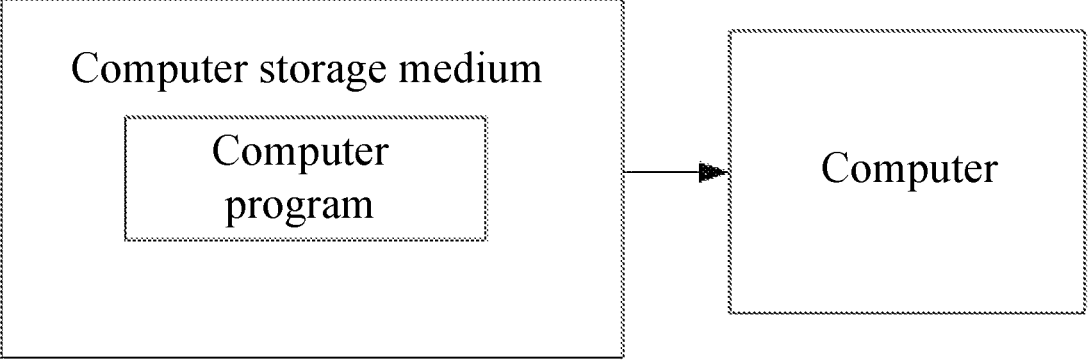
FIG. 3 is a structural diagram of a computer-readable storage medium in Embodiment 2.

The illustrative implementation modes are described more comprehensively below with reference to the accompanying drawings. However, the illustrative implementation modes can be implemented in various forms, and should not be construed as being limited to those described herein. On the contrary, these implementation modes are provided to make the present disclosure comprehensive and complete and to fully convey the concept of the illustrative implementation modes to those skilled in the art. The same reference numerals in the figures indicate the same or similar structures, and thus their detailed descriptions are omitted.

The terms "a", "an", and "the" are used to indicate that there are one or more elements/components/etc. The terms "comprise" and "have" are used to mean open-ended inclusion and mean that there may be additional elements/components/etc. besides the listed elements/components/etc.

An Ethereum Improvement Proposal (EIP) is a standard proposed by developers to define the development of Ethernet software (including client software, smart contracts, etc.). Once an EIP is reviewed and approved by the Ethereum core team, it will be recommended as a standard for Ethereum developers throughout the world to follow and use. The key developments and deployments of Ethereum are currently driven by a series of EIPs. While developing an Ethereum application in accordance to an EIP approved, a developer needs to check the standards, protocols, parameters, return values, visibility and function modifiers defined in the EIP and analyze possible attacks on codes implemented in accordance with the EIP, possible security risks, and precautionary measures to prevent such attacks and avoid security risks and vulnerabilities in concrete implementation.

Moreover, smart contracts running on Ethereum cannot be modified or withdrawn once they are deployed to Ethereum. Thus, as for a smart contract application, in order to ensure that the smart contract is successful once it is deployed, and especially to ensure that the contract is as secure as possible (i.e., with few or even no security vulnerabilities and hidden dangers), the developer will submit codes to a third-party code auditing company for review before deploying the contract to Ethereum. The third-party code auditing company will find out the vulnerabilities and security risks and eliminate them before deployment. Consequently, contract auditing plays a crucial role in the development of Ethereum contracts. When reviewing codes of the smart contract, auditors compare the codes with the EIP, review whether the codes implement the standards, protocols, parameters, return values, visibility and function modifiers defined in the EIP, and check whether all these elements have been secured in the codes, to prevent possible risks and vulnerabilities.

For a complicated application involving a large number of EIPs, both developers and auditors are required to view and analyze in detail all the EIP standards involved in the codes, and check the elements in each EIP standard one by one. Typically, the EIP standards are searched and queried manually one by one with low efficiency, inescapable flaws and low accuracy, because the developers and the auditors cannot be thoroughly familiar with the EIP standards.

Embodiment 1

As shown in FIG. 1, according to an aspect of the present disclosure, a method for automatically generating a risk evaluation dimension library for an EIP is provided.

The method for automatically generating a risk evaluation dimension library for an EIP specifically includes:

S1: extract the EIP, and automatically extract information about all interfaces in the EIP, where the information includes standards, protocols, parameters, return values, visibility and function modifiers; and S2: construct a risk matrix library of the EIP by taking the interfaces as one dimension and taking the parameters, the return values, the visibility and the function modifiers as other dimensions, and evaluate a risk of the EIP according to an EIP standard and an element definition standard in the EIP standard.

Firstly, the EIP is extracted, and the information about all the interfaces involved in the EIP is extracted, the information including standards, protocols, parameters, return values, visibility and function modifiers. The risk matrix library of the EIP is constructed by taking the interfaces as one dimension and taking the parameters, the return values, the visibility and the function modifiers as other dimensions, and the risk of the EIP is evaluated in multi-dimensions according to preset relevant standards, such that a risk situation in this case may be determined automatically and accurately.

By using automatic extraction, the information about all the interfaces involved in the EIP, including standards, protocols, parameters, return values, visibility and function modifiers, are extracted. According to the requirements of the standards, the risk matrix library of the EIP is constructed by taking the interfaces as one dimension and taking the parameters, the return values, the visibility and the function modifiers as other dimensions, to evaluate the risk of the EIP. The problems of long time, low efficiency, omission of the EIP standard that should be inspected and the elements defined in the EIP standard, and ignorance of safety measures that need to be considered for these elements in an original method that only adopts manual search are solved, such that the risk of the EIP may be evaluated more quickly and accurately.

In another possible embodiment, any one or more of the standards, the protocols, the parameters, the return values, the visibility and the function modifiers in interface information in the EIP may also be automatically extracted, and a risk of any one or more of the standards, the protocols, the parameters, the return values, the visibility and the function modifiers is evaluated according to a requirement of a corresponding standard.

When the risk of the EIP needs to be evaluated only from some or any one of the standards, the protocols, the parameters, the return values, the visibility and the function modifiers, only some or any one of the standards, the protocols, the parameters, the return values, the visibility and the function modifiers needs to be extracted, to be subjected to a risk evaluation, such that a risk evaluation strategy in this case is more controllable and diversified. When not all information needs the risk evaluation, for the overall technical solution, in another possible embodiment, the step of extracting the EIP specifically includes:

S11: access a website of the EIP library;

S12: extract a link of the EIP; and

S13: extract the EIP by means of the link.

Since the EIP basically displays an EIP stored in a server in a form of a webpage, and the EIP is extracted by means of the link of the EIP, such that the data may be conveniently extracted, and complete and accurate extraction of the EIP may be achieved.

In another possible embodiment, the information about all the interfaces in the EIP is located by means of a paragraph corresponding to a keyword "specification", and is then extracted, and when the keyword of the paragraph where the information is located changes, the information is extracted according to a paragraph corresponding to the changed keyword.

In general, when information about all interfaces in an EIP is stored in a webpage, the information is stored in a paragraph corresponding to a keyword "specification". When the definition of the keyword changes in a later stage, the paragraph in this case is correspondingly adjusted and extracted according to the changed keyword, to accurately locate and extract the information.

In another possible embodiment, the information about all the interfaces is located by means of a keyword "function" corresponding to the information, data between a symbol (and a symbol) during location is extracted, a visibility keyword and a function modifier keyword defined after the symbol) are extracted, and when a definition mode or an information storage mode corresponding to the information about all the interfaces later changes, the information is extracted in a new definition mode.

In general, the information about all interfaces is started with a corresponding keyword "function", the data is stored between the symbol (and the symbol), the visibility keyword and the function modifier keyword are stored after the symbol), and when the definition mode changes, an automatic extraction method extracts the information in a new definition mode.

In another possible embodiment, the extracted data, the visibility keyword and the function modifier are stored in a row vector $M_i$ in a form of an element, i being all ith interfaces, $M_i=[a_{i1}, a_{i2}, \ldots, a_{ij}]$, $a_{ij}$ representing a jth element of all the ith interfaces, a number of elements is j in total, and when a total number of the data, the visibility keywords and the function modifiers corresponding to all the interfaces is less than j, the remaining elements are supplemented in a form of empty elements.

By storing the extracted data, the visibility keywords and the function modifiers in the row vectors, a final structure becomes more consistent, so as to greatly facilitate determination of information about all interfaces.

In another possible embodiment, row vectors of all the interfaces are stored in a form of a matrix.

In another possible embodiment, the elements in the matrix are stored in a type of structure data.

It should be understood that storing and calculating steps (as well as other steps) described above are performed electronically utilizing a computer(s) having a processor(s) and memory in preferred embodiments.

Embodiment 2

As shown in FIG. 3, in another aspect, an embodiment of the present application provides a computer-readable storage medium, storing a computer program. When the computer program is executed in a computer, the computer executes the above method for automatically generating a risk evaluation dimension library for an EIP.

Embodiment 3

In yet another aspect, an embodiment of the present application provides a computer program product, storing an instruction. When the instruction is executed by a computer, the computer implements the above method for automatically generating a risk evaluation dimension library for an EIP.

In the embodiments of the present disclosure, the term "a plurality of" means two or more, unless otherwise specifically defined. Terms "mount", "connect", "fix", etc. should be understood in a broad sense. For example, "connection" may be a fixed connection, a detachable connection or an integrated connection. Those of ordinary skill in the art may understand specific meanings of the above terms in the embodiments of the present disclosure based on a specific situation.

It should be understood that in the description of the embodiments of the present disclosure, the terms "up", "down", etc. indicate the orientation or position relationships based on the accompanying drawings. These terms are merely intended to facilitate description of the embodiments of the present disclosure and simplify the description, rather than to indicate or imply that the mentioned device or unit must have a specific direction and must be constructed and operated in a specific orientation. Therefore, these terms should not be construed as a limitation to the embodiments of the present disclosure.

In the description of this specification, the description of the terms "an embodiment", "a preferred embodiment", etc. means that the specific features, structures, materials, or characteristics described with reference to the embodiment or example are included in at least one embodiment or example of the embodiments of the present disclosure. In this specification, the schematic descriptions of the above terms do not necessarily refer to the same embodiment or example. Moreover, the specific features, structures, materials, or characteristics described may be combined in any suitable manner in any one or more embodiments or examples.

What are described above are merely preferred embodiments of the embodiments of the present disclosure, and are not intended to limit the embodiments of the present disclosure. Various changes and modifications may be made to the embodiments of the present disclosure by those skilled in the art. Any modifications, equivalent substitutions, improvements, etc. made within the spirit and scope of the embodiments of the present disclosure should be included within the protection scope of the embodiment of the present disclosure.

What is claimed is:

1. A method for automatically generating a risk evaluation dimension library for an Ethereum Improvement Proposal (EIP), comprising:
   extracting the EIP, and automatically extracting information about all interfaces in the EIP, wherein the information comprises standards, protocols, parameters, return values, visibility and function modifiers; and
   constructing a risk matrix library of the EIP by taking the interfaces as one dimension and taking the parameters, the return values, the visibility and the function modifiers as other dimensions, and evaluating a risk of the EIP according to an EIP standard and an element definition standard in the EIP standard; and
   using the risk evaluation dimension library to evaluate risk associated with the EIP.

2. The method for automatically generating the risk evaluation dimension library for an EIP according to claim 1, wherein any one or more of the standards, the protocols, the parameters, the return values, the visibility and the function modifiers in the information about the interfaces in the EIP are automatically extracted, and a risk of any one or more of the standards, the protocols, the parameters, the return values, the visibility and the function modifiers is evaluated according to a requirement of a corresponding standard.

3. The method for automatically generating the risk evaluation dimension library for an EIP according to claim 1, wherein the extracting the EIP specifically comprises:
   accessing a website of a library of the EIP library;
   extracting a link of the EIP; and
   extracting the EIP by means of the link.

4. The method for automatically generating the risk evaluation dimension library for an EIP according to claim 1, wherein the information about all interfaces in the EIP is located by means of a paragraph corresponding to a keyword "specification", and is then extracted, and when the keyword of the paragraph where the information is located changes, the information is extracted according to a paragraph corresponding to the changed keyword.

5. The method for automatically generating the risk evaluation dimension library for an EIP according to claim 4, wherein the information about all interfaces is located by means of a keyword "function" corresponding to the information, data between a symbol "(" and a symbol ")" during location is extracted, a visibility keyword and a function modifier keyword defined after the symbol ")" are extracted, and when a definition mode or an information storage mode corresponding to the information about all the interfaces later changes, the information is extracted in a new definition mode.

6. The method for automatically generating the risk evaluation dimension library for an EIP according to claim 5, wherein the extracted data, the visibility keyword and the function modifier are stored in a row vector $M_i$ in a form of an element, i being all ith interfaces, $M_i=[a_{i1}, a_{i2}, \ldots, a_{ij}]$, $a_{ij}$ representing a jth element of all the ith interfaces, a number of elements is j in total, and when a total number of the data, the visibility keywords and the function modifiers corresponding to all the interfaces is less than j, the remaining elements are supplemented in a form of empty elements.

7. The method for automatically generating the risk evaluation dimension library for an EIP according to claim 6, wherein row vectors of all the interfaces are stored in a form of a matrix.

8. The method for automatically generating the risk evaluation dimension library for an EIP according to claim 7, wherein the elements in the matrix are stored in a type of structure data.

9. A non-transitory computer-readable storage medium, storing a computer program, wherein when the computer program is executed in a computer, the computer executes the method for automatically generating the risk evaluation dimension library for an EIP according to claim 1.

10. The non-transitory computer-readable storage medium according to claim 9, wherein any one or more of the standards, the protocols, the parameters, the return values, the visibility and the function modifiers in the information about the interfaces in the EIP are automatically extracted, and a risk of any one or more of the standards, the protocols, the parameters, the return values, the visibility and the function modifiers is evaluated according to a requirement of a corresponding standard.

11. The non-transitory computer-readable storage medium according to claim 9, wherein the extracting the EIP comprises:

accessing a website of the EIP library;

extracting a link of the EIP; and extracting the EIP by means of the link.

12. The non-transitory computer-readable storage medium according to claim 9, wherein the information about all interfaces in the EIP is located by means of a paragraph corresponding to a keyword "specification", and is then extracted, and when the keyword of the paragraph where the information is located changes, the information is extracted according to a paragraph corresponding to the changed keyword.

13. The non-transitory computer-readable storage medium according to claim 12, wherein the information about all interfaces is located by means of a keyword "function" corresponding to the information, data between a symbol "(" and a symbol ")" during location is extracted, a visibility keyword and a function modifier keyword defined after the symbol ")" are extracted, and when a definition mode or an information storage mode corresponding to the information about all the interfaces later changes, the information is extracted in a new definition mode.

14. The non-transitory computer-readable storage medium according to claim 13, wherein the extracted data, the visibility keyword and the function modifier are stored in a row vector $M_i$ in a form of an element, i being all ith interfaces, $M_i=[a_{i1}, a_{i2}, \ldots, a_{ij}]$, $a_{ij}$ representing a jth element of all the ith interfaces, a number of elements is j in total, and when a total number of the data, the visibility keywords and the function modifiers corresponding to all the interfaces is less than j, the remaining elements are supplemented in a form of empty elements.

15. The non-transitory computer-readable storage medium according to claim 14, wherein row vectors of all the interfaces are stored in a form of a matrix.

16. The non-transitory computer-readable storage medium according to claim 15, wherein the elements in the matrix are stored in a type of structure data.

* * * * *